United States Patent [19]

Dwyer

[11] 3,859,227
[45] Jan. 7, 1975

[54] STABLE SLOW-SETTING CATIONIC BITUMINOUS EMULSIONS AND THEIR PREPARATION

[75] Inventor: Donald J. Dwyer, Oakland, Calif.

[73] Assignee: Chevron Research Company, San Francisco, Calif.

[22] Filed: Aug. 24, 1972

[21] Appl. No.: 283,463

Related U.S. Application Data

[63] Continuation of Ser. No. 776,313, Nov. 14, 1968, abandoned, which is a continuation of Ser. No. 515,173, Dec. 20, 1965, abandoned.

[52] U.S. Cl. ............... 252/311.5, 106/277, 252/355, 252/DIG. 1
[51] Int. Cl. ......................... B01j 13/00, C09d 3/24
[58] Field of Search ................... 252/311.5; 106/277

[56] References Cited
UNITED STATES PATENTS

| | | | |
|---|---|---|---|
| 1,989,374 | 1/1935 | McConnaughay | 252/311.5 |
| 2,494,708 | 1/1950 | Jesseph | 252/311.5 |
| 2,577,773 | 12/1951 | Lambert | 252/542 X |
| 2,854,444 | 9/1958 | Monson et al. | 252/353 X |
| 3,126,350 | 3/1964 | Borgfeldt | 252/311.5 |

OTHER PUBLICATIONS

Encyclopedia of Chemical Technology, Edited by Kirk–Othmer, Intersciences Encyclopedia, Inc., New York, 1952, Vol. 8, pages 327–333. [copy in Sci. Lib. TP9E68.]

Primary Examiner—Richard D. Lovering
Attorney, Agent, or Firm—G. F. Magdeburger; C. J. Tonkin; B. G. Fehringer

[57] ABSTRACT

Cationic slow-setting bituminous emulsions with water as the continuous phase having at an acid pH, in combination, as emulsifiers, a cationic emulsifier which is an ethylene or propylene diamine substituted with an aliphatic hydrocarbon group of from 12 to 30 carbon atoms, an alkylphenylpolyoxyalkylenealkanol nonionic emulsifier, and a lignosulfonate salt.

13 Claims, No Drawings

STABLE SLOW-SETTING CATIONIC BITUMINOUS EMULSIONS AND THEIR PREPARATION

CROSS-REFERENCE TO RELATED APPLICATIONS

This application is a continuation of application Ser. No. 776,313, filed No. 14, 1968, now abandoned, which was in turn a continuation of U.S. Ser. No. 515,173 filed Dec. 20, 1965, now abandoned. This invention concerns novel slow-setting asphalt emulsions. More particularly, this invention concerns novel cationic slow-setting emulsions and their method of preparation.

Cationic asphalt emulsions can be used with a wide variety of aggregate types, e.g., siliceous, limestone, etc., providing excellent adhesion, and therefore find extensive use. Moreover, the cationic emulsions are found to be effective under relatively damp or wet conditions, adhering to the aggregate without stripping. While rapid-setting cationic emulsions are easily obtainable with a wide variety of cationic emulsifiers, particularly amine emulsifiers, slow-setting asphalt emulsions are more difficultly obtainable. Generally, stabilizers are added to the rapid-setting cationic emulsion in order to obtain a slow-setting cationic emulsion.

The dense mixing grade or slow-setting (SS-type) bituminous emulsions which are employed to prepare the densely graded fine aggregate containing mixes must be specially formulated to permit easy handling and ready application in paving work. The emulsions must remain stable (must not break down at once) on being mixed with fine materials: particles of Portland cement, fine sand, pit run, crusher run, and clay bearing aggregates. But once applied to the surface being paved or repaired, they should dehydrate rapidly and satisfactorily and display thorough penetration and firm adhesion of the bituminous binder to the aggregate in order to form a satisfactory pavement base, slurry seal or floor surface.

It has now been found that excellent slow-setting type oil in water (o/w) cationic bituminous emulsions may be prepared by adding a lignosulfonate to a rapid-setting cationic o/w bituminous emulsion in the presence of a nonionic emulsifier. (By oil in water emulsion is intended an emulsion with water as the continuous phase. By cationic emulsion is intended an emulsion in which the particles migrate to the negative pole under electroplating conditions. Rapid-setting emulsions are well known in the art. When nonionic emulsifiers are added, the resulting emulsions are preferably considered semi-stable cationic emulsions, since the cationic emulsions containing the nonionic emulsifier may not fulfill all the specifications of a rapid-setting cationic emulsion.)

The rapid-setting cationic o/w bituminous emulsions will for the most part have from about 50 to less than 80 weight per cent of a bituminous material, usually 55 to 75 weight per cent. Any bituminous substance may be employed in the emulsions: asphalts, asphaltites, pyrobitumens, pyrogenous distillates, pyrogenous residues, etc., may be used. The penetration may vary from about 40 to about 300. More usually, the penetrations will be in the range of about 75 to 200.

One or more cationic emulsifiers may be used. The cationic emulsifiers generally have one or more amino nitrogens, usually from about 1 to 3 amino nitrogens. Included within the cationic emulsifiers are monoamines, diamines, quaternary ammonium compounds and imidazolines. These emulsifiers are commercially available and well known in the art. Generally, the emulsifier will have a hydrocarbon group free of aromatic unsaturation of from about 12 to 30 carbon atoms, more usually from about 14 to 20 carbon atoms. The preferred cationic emulsifiers are the ethylene and propylene diamines substituted with an aliphatic hydrocarbon of from 14 to 20 carbon atoms.

Illustrative cationic emulsifiers are Diams (supplied by General Mills), Duomeens (supplied by Amour Industrial Chemical Co.), Kemamines (supplied by Humko Chemical Co.) Illustrative compositions include N-oleyl ethylene diamine, N-hexadecyl ethylene diamine, N-octadecyl propylene diamine, octadecyl trimethyl ammonium chloride, N-2-aminoethyl hexadecyl imidazoline, octadecyl amine, itc.

In the rapid-setting cationic emulsions, the pH's will generally be in the range of about 1 to 5.5, more usually about 1.5 to 4. The pH can be achieved with many acids, but usually a mineral acid such as hydrochloric acid is used; however, an acid such as acetic acid may also find use. The particular acid is one of convenience, limited mainly by its compatibility with the other materials present in the emulsion.

The rapid-setting cationic emulsion will generally be prepared at elevated temperatures. Usually, the temperature of the asphalts will be at least about 225°F. and more usually in the range of about 250°–300°F. The particular temperature used is one of convenience in providing a satisfactory viscosity for emulsifying the asphalt. The temperature of the water which is generally combined with the acid and emulsifier will usually range from about 65°F. to 190°F., more usually from about 75°F. to 135°F.

The amount of cationic emulsifier used will vary with the amount and type of bitumen to be emulsified, being at least about 0.05 weight per cent of the emulsion. Usually, about 0.1 to 1 weight percent of emulsifier will be used, more usually from about 0.1 to about 0.5 weight per cent. Except for the addition of special additives, the remaining portion of the emulsion will be water.

The lignosulfonate which is used is commercially available and obtained from the treatment of wood products with bisulfite and sulfur dioxide in the presence of base. The most common bases are the magnesium, calcium, sodium or ammonium hydroxides. The materials referred to as lignosulfonates are believed to be polymers with molecular weights in the range of about 2,000 to 15,000. The lignosulfonates are sold under a variety of labels such as Marasperse, Maratan, Goulac, Orzan, Vixil, etc. As already indicated, the common cations are magnesium, calcium, sodium and ammonia, although the lignosulfonates can be obtained with other cations, such as iron or chromium. The preferred cations for this invention are the alkali or alkaline earth metal cations of atomic number 11–20, i.e., sodium (11), potassium (19), magnesium (12) and calcium (20) (atomic number).

The lignosulfonate is obtained in a variety of forms. It may be used as a powder, as a slurry, or as a highly concentrated solution. For manipulative convenience, it is preferably used in the form of a 40 to 60 weight per cent aqueous solution.

The nonionic emulsifiers are preferably alkylphenoxypolyalkyleneoxyalkanols, usually alkylphenoxypolyethyleneoxyethanols. Generally, the alkyl groups will be of from about 6 to 20 carbon atoms. Usually, the nonionic emulsifier should have at least about 75 weight per cent alkyleneoxy and more usually from about 85 to 99 weight per cent alkyleneoxy. That is, relatively long polymeric chains of the alkyleneoxy, usually ethyleneoxy, will be present with only minor amounts of the alkylphenol group, as an end group. (An "alkyleneoxy" group is —RO— where R is alkylene. )

The rapid-setting c/w cationic bituminous emulsion is readily prepared by known methods, the usual conditions having already been indicated. The asphalt is heated to fluidity at the temperatures already mentioned, and then mixed in the proper proportions with a dilute aqueous solution of the cationic emulsifier adjusted to the desired pH in a colloid mill or other apparatus providing high shear. If desired, the lignosulfonate salt and a nonionic emulsifier may also be included in the water phase. It is only essential when adding the lignosulfonate, that the nonionic emulsifier also be present.

If desired, the nonionic emulsifier may be included during the preparation of the cationic emulsion and the lignosulfonate added subsequently in an independent step or the cationic emulsion may be prepared independently and the nonionic emulsifier and the lignosulfonate added. The former method, in which the lignosulfonate is added subsequent to the prior preparation of a semi-stable (containing nonionic emulsifier) cationic bituminous emulsion, is the preferred method of preparation.

The amount of lignosulfonate added will generally range from about 0.1 to 3 weight per cent of the total bituminous emulsion, more usually from about 0.5 to 2 weight per cent. The amount of nonionic emulsifier will generally be in the range from about 0.2 to 1 weight per cent, more usually 0.25 to 0.75 weight per cent of the total composition. When the lignosulfonate and/or the nonionic emulsifiers are added to the previously prepared rapid-setting cationic emulsion, they may be added neat or as concentrated aqueous solutions. If for any reason the pH of the final emulsion is not satisfactory, e.g., too high, it may be adjusted after the addition of the lignosulfonate with a further addition of a mineral acid, such as hydrochloric acid, to obtain the desired pH. The final pH will generally be in the range of 1 to 6.5, usually in the range of 1 to 5.

The addition of the lignosulfonate, either by itself or in combination with the nonionic emulsifier, may be carried out at ambient temperature, i.e., approximately 20°C., or elevated temperatures up to about 95°C. It is found that at elevated temperatures more care must be taken in the choice of materials, preferably using N-alkyl diamine cationic emulsifiers and alkaline earth lignosulfonates.

As desired, other additives may also be included in the emulsion. These additives include salts, e.g., calcium chloride, sodium dichromate, sodium chloride, etc. Of particular importance to this invention is that from about 3 to 20 weight per cent based on bitumen, usually about 15 weight per cent, of a hydrocarbon solvent boiling in the range of 100° to 600°F., such as naphtha, may be added to the emulsion to provide the sand mixing (SM) grade emulsion. Not all cationic emulsions are stable upon the addition of relatively low viscosity hydrocarbonaceous liquids. The SM grade finds use with dry, dense-graded aggregates, and dry sands.

The cationic bituminous slow-setting emulsion prepared as described above is now ready to be used with a variety of aggregates. The emulsion is stable, that is, it may be stored for long periods of time without settling, or may be taken immediately to the job site to be mixed there with the aggregate in available motorized mixing equipment.

In order to demonstrate the effectiveness of the emulsions of this invention, the following tests were carried out:

Cement Test. This test, representing a modification of ASTM D-244 test, serves to determine the extent of breakdown or coagulation upon mixing the emulsion with Portland cement. The test procedure consists of placing 50 g. of cement sifted through a sieve of 80 mesh into a 500 ml. porcelain cup. An amount of the emulsion diluted to 55 per cent asphalt residue is placed into a 100 ml. graduate which is then filled to the 100 ml. mark with water and the contents mixed. The diluted emulsion is then poured over the cement in the cup and the mixture stirred at approximately 60 r.p.m. for one minute, maintaining the temperature between 60° – 80°F. Distilled water in an amount equal to 150 ml. is added and stirred for 3 minutes. This mixture is in turn poured over a previously weighed 14 mesh sieve ($W_s$). the cup is rinsed with the distilled water and the rinsing repeated, pouring the rinsing through the sieve until the drainings are no longer colored. A can lid of sufficient size to hold the sieve is weighed ($W_1$). The sieve and its contents are placed on the lid and then dehydrated on a hot plate adjusted to a low temperature. After cooling, the can lid and sieve are weighed. The cement test residue ($C_R$) is determined by subtracting from the weight of the lid and the sieve after dehydrating ($W_r$) the sum of the tared weights of the sieve ($W_s$) and of the lid ($W_1$). The value ($C_r$) exceeding 3 g. is considered not to pass the test.

Sieve Test. In this test, likewise a modification of ASTM D-244 test, one kilogram of the emulsion is poured through weighed sieves of different mesh sizes, moistened with a 2 per cent solution of sodium oleate. After drying for 2 hours at 220°F., the sieve is reweighed and the percentage of the solid phase retained is determined. The results indicate the average degree of dispersion (particle size) of the solid phase of the emulsion.

Adhesion Test. In this test, 100 g. of aggregate passing through a 3/8 inch screen and retained on a No. 10 sieve is washed with distilled water and then air dried. Thereupon 8 g. of the emulsion heated to 120°F. is added to the aggregate at room temperature and mixed thoroughly therewith. The resulting mixutre is placed for 24 hours into an oven at 200°F. The sample is then remixed until each stone appears thoroughly coated. One-half of the coated mixture is then placed in a 600 ml. beaker containing 400 ml. of boiling distilled water and stirred vigorously for 1 minute at 60 r.p.m. The boiling is stopped and the asphalt floating on the surface is skimmed off with absorbent paper. The sample of the aggregate is removed with a spoon and placed on absorbent paper for air drying. The percentage of adhesion of the asphalt is estimated visually for each sample.

The following table indicates the composition of the asphalt, and the results of the above tests.

TABLE I

| Ex. | Cationic[1] Emulsifier | | Lingo- sulfonate[2] | | Asphalt | | | Water | pH[3] | Process[4] | Sieve Test | Cement[5] Mix Test | Adhesion Test % |
|---|---|---|---|---|---|---|---|---|---|---|---|---|---|
| | | wt.% | | wt.% | Pen. | wt. % | T°F | T°F | | | | | |
| I | A | 0.1 | A | 1 | 85/100 | 60 | 242 | 100 | 1.9 | 1 | Trace | P | 95 |
| II | B A | 0.2 0.1 | B | ~1 | 85/100 | 70 | 270 | 100 | 2.3 | 2 | 0.02 | P | 95 |
| III | A | 0.1 | B | ~1 | 85/100 | 70 | 270 | 100 | 2.3 | 2 | 0.02 | P | 95 |
| IV | A | 0.12 | B | ~1 | 85/100 | 70 | 272 | 96 | 2.25 | 2 | 0.03 | P | 95 |
| V | A | 0.12 | B | ~1 | 85/100 | 70 | 270 | 92 | 2.2 | 3 | 0.03 | P | 95 |

Note: ~0.5 wt. % Igepal CO 990 (alkylphenoxy poly(ethyleneoxy)ethanol supplied by General Aniline & Film Corp.) was used in the preparation of each of the above emulsions.
[1] A — Humko Diamine (N-alkyl propylene diamine supplied by Humko Div. of National Dairy Products Corp.)
B — Arquad T-50 (monoalkyl dialkyl quaternary ammonium salts supplied by Armour Industrial Chemical Co.)
[2] A — Goulac - Ca/Mg lignosulfonate supplied by Robeson Process Co.
B — Mg lignosulfonate supplied by Weyerhauser Co. as 52 wt. % aqueous solution.
[3] pH of emulsifying water solution.
[4] 1 — All the emulsifiers added simultaneously.
2 — Rapid setting cationic emulsion prepared and nonionic emulsifier and lignosulfonate added to hot (~190°F.) cationic emulsion.
3 — Rapid setting cationic emulsion prepared containing nonionic emulsifier and lignosulfonate added to hot (~190°F.) cationic emulsion.
[5] P — pass It is evident from the above results that the present emulsions fulfill the standards for a slow-setting emulsion, avoiding the handicaps of emulsion instability: breakdown and coagulation on contact with fine low grade aggregates, sand and cement. Moreover, good adhesion between the asphalt binder and the aggregate is obtained providing a firmly sealed paving structure.

As will be evident to those skilled in the art, various modifications on this invention can be made or followed, in the light of the foregoing disclosure and discussion, without departing from the spirit or scope of the disclosure or from the scope of the following claims.

I claim:

1. A cationic slow-setting bituminous emulsion having water as the continuous phase comprising from about 50 to less than 80 weight per cent of a bituminous material having a penetration in the range of about 40 to 300, at least about 0.05 weight per cent of the total emulsion of a cationic emulsifier which is an ethylene or propylene diamine substituted with an aliphatic hydrocarbon group of from 12 to 30 carbon atoms, from about 0.2 to 1 weight per cent of an alkylphenylpolyoxyalkylenealkanol nonionic emulsifier having at least 75 weight per cent alkyleneoxy alkanol, and wherein said alkyl group is of from about 6 to 20 carbon atoms, from about 0.1 to 3 weight per cent of a lignosulfonate salt and the remainder water, wherein the pH is in the range of 1 to 5.5.

2. A composition to claim 1, wherein said cationic emulsifier is present in an amount of from about 0.1 to 1 weight per cent, said nonionic emulsifier is present in an amount of from 0.25 to 0.75 weight per cent and said lignosulfonate salt is present in an amount of from about 0.5 to 2 weight per cent of said emulsion.

3. A composition according to claim 2, wherein said cationic emulsifier is an N-alkyl alkylene diamine, wherein said alkyl group is from 12 to 30 carbon atoms, and said alkylene is ethylene or propylene.

4. A composition to claim 1, wherein said lignosulfonate salt is a salt of an alkali metal, alkaline earth metal, iron, chromium or ammonium.

5. A composition according to claim 4, wherein said lignosulfonate salt is a salt of an alkaline earth metal.

6. A composition according to claim 1, wherein said cationic emulsifier is an N-alkyl alkylene diamine, wherein said alkyl group is from 14 to 20 carbon atoms and said lignosulfonate salt is an alkaline earth metal salt.

7. A composition according to claim 6, wherein said alkaline earth metal is calcium.

8. A composition according to claim 6, wherein said alkaline earth metal is magnesium.

9. A sand-mixing grade cationic bituminous emulsion having water as the continuous phase comprising from about 50 to 70 weight per cent of a bituminous material having a penetration in the range of about 40 to 300, from 3 to 20 weight per cent based on bituminous material of a hydrocarbon solvent boiling in the range of about 100° to 600°F. at least about 0.05 weight per cent of the total emulsion of a cationic emulsifier which is ethylene or propylene diamine substituted with an aliphatic hydrocarbon of from 12 to 30 carbon atoms, from about 0.2 to 1 weight per cent of alkylphenylpolyoxyalkylenealkanol nonionic emulsifier having at least 75 weight per cent alkyleneoxy alkanol, wherein said alkyl group is from about 6 to 20 carbon atoms, from about 0.1 to 3 weight per cent of a lignosulfonate salt and the remainder water, wherein the pH is in the range of 1 to 5.5.

10. A method of preparing slow-setting cationic bituminous emulsions having water as the continuous phase which comprises preparing a rapid-setting bituminous cationic emulsion having from about 50 to less than 80 weight per cent of a bitumen of a penetration in the range of about 40 to 300, at least about 0.05 weight per cent of a cationic emulsifier which is ethylene or propylene diamine substituted with an aliphatic hydrocarbon of from 12 to 30 carbon atoms and a pH in the range of about 1 to 5.5, adding an alkylphenylpolyoxyalkylenealkanol nonionic emulsifier having at least about 85 weight per cent of alkyleneoxy alkanol, wherein said alkyl group is from about 6 to 20 carbon atoms, and in the presence of said nonionic emulsifier form 0.1 to 3 weight per cent of the total emulsion of a lignosulfonate salt.

11. A method according to claim 10, wherein the nonionic emulsifier is added during the preparation of the rapid-setting cationic emulsion forming a semi-stable cationic emulsion.

12. A cationic slow-setting bituminous emulsion according to claim 1, wherein the pH is in the range of 1 to 4.

13. A composition according to claim 5 wherein the pH is in the range of 1 to 4.

* * * * *

PO-1050
(5/69)

UNITED STATES PATENT OFFICE
CERTIFICATE OF CORRECTION

Patent No. 3,859,227　　　　　　　　　　Dated　January 7, 1975

Inventor(s)　Donald J. Dwyer

It is certified that error appears in the above-identified patent and that said Letters Patent are hereby corrected as shown below:

Col. 3, line 12, "c/w" should read --o/w--.

Col. 6, line 54, "85" should read --75--.

Signed and sealed this 10th day of June 1975.

(SEAL)
Attest:

RUTH C. MASON
Attesting Officer

C. MARSHALL DANN
Commissioner of Patents
and Trademarks